(No Model.)  
J. M. GRIFFITH.  
CULTIVATOR.
No. 304,097. Patented Aug. 26, 1884.
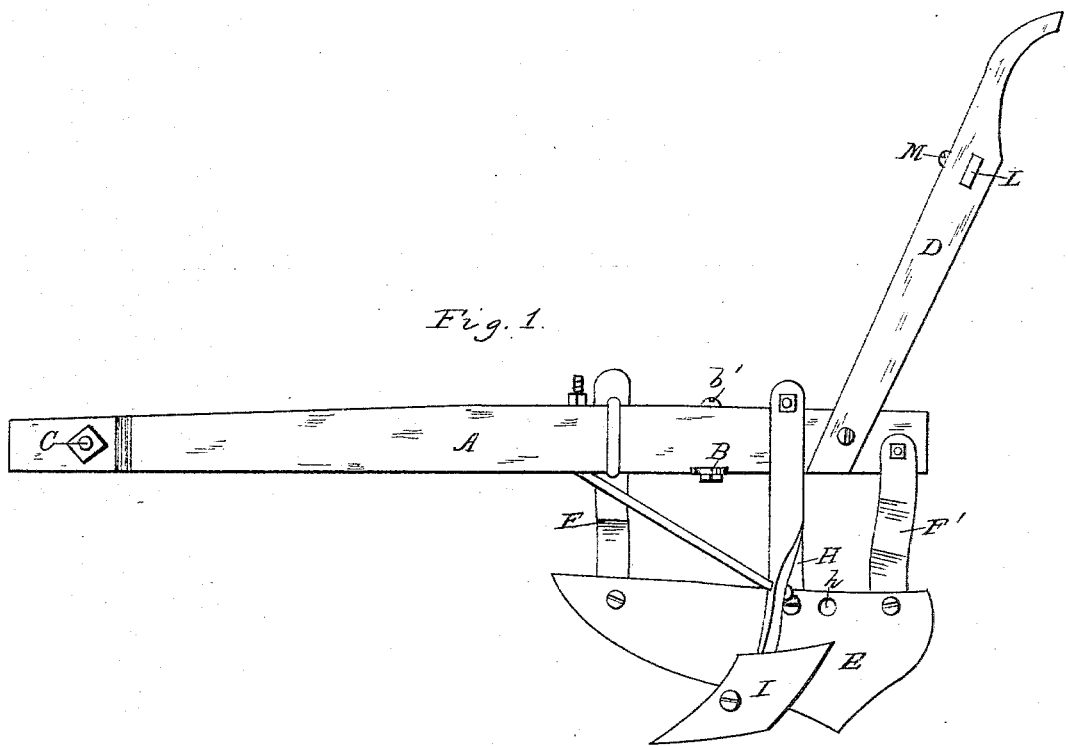
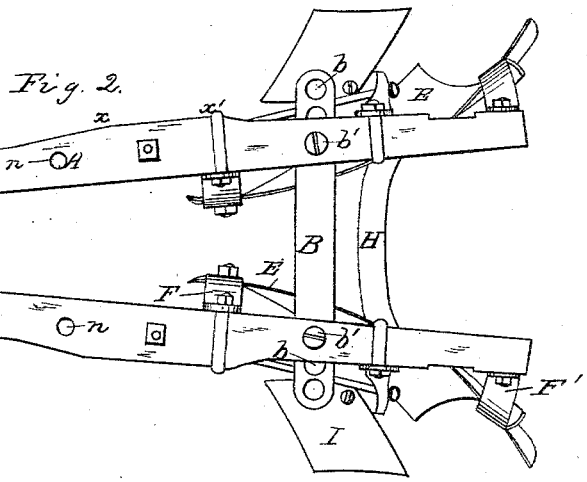
Witnesses:
H. E. Bliss
J. S. Barker
Inventor:
James M. Griffith
by Charles King & Wm. B. King
attys.

(No Model.) 2 Sheets—Sheet 2.
J. M. GRIFFITH.
CULTIVATOR.
No. 304,097. Patented Aug. 26, 1884.
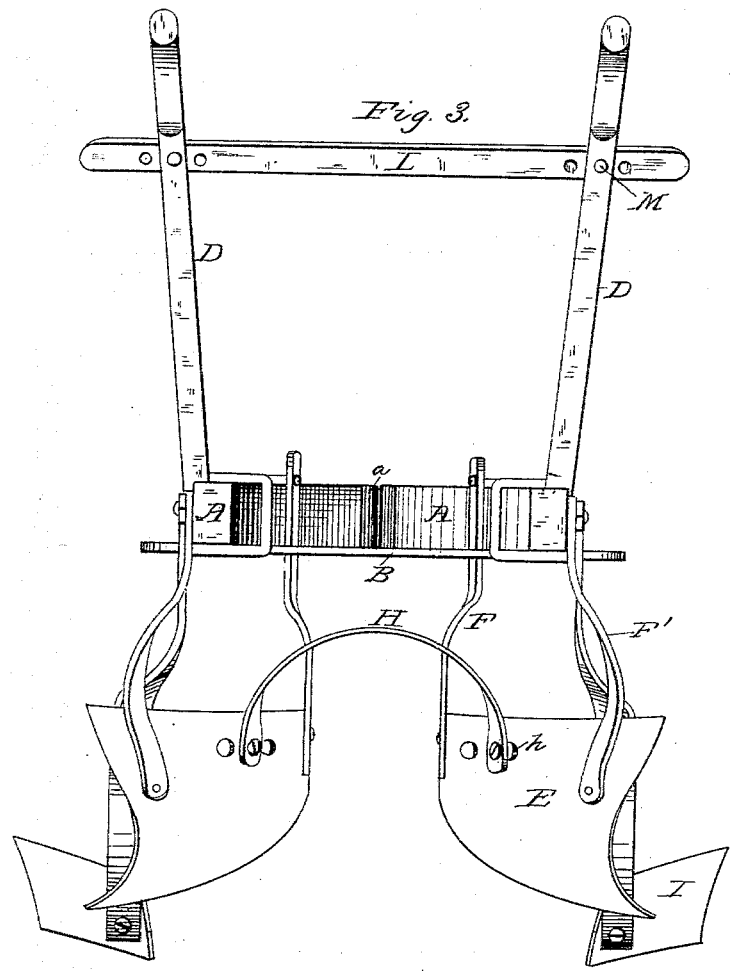
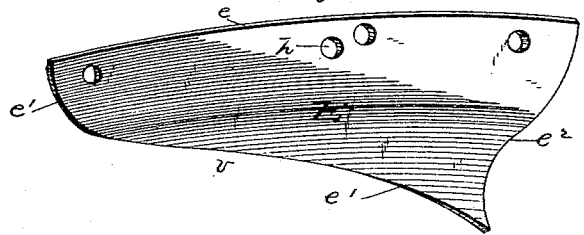
Witnesses:
H. E. Bliss.
J. S. Barker.
Inventor:
James M Griffith
by Charles King & Wm B King attys

UNITED STATES PATENT OFFICE.

JAMES M. GRIFFITH, OF PALARM, ARKANSAS.

CULTIVATOR.

SPECIFICATION forming part of Letters Patent No. 304,097, dated August 26, 1884.

Application filed April 17, 1884. (No model.)

*To all whom it may concern:*

Be it known that I, JAMES M. GRIFFITH, a citizen of the United States, residing at Palarm, in the county of Faulkner and State of Arkansas, have invented certain new and useful Improvements in Cultivators, of which the following is a specification, reference being had therein to the accompanying drawings.

Figure 1 is a side view of my improved cultivator. Fig. 2 is a top view of the same. Fig. 3 is a rear view. Fig. 4 is a perspective view of one of the scrapers.

In the drawings, A A are beams which constitute the frame of the machine. They are secured together at their front ends by a bolt, C, which may also secure the clevis. The beams diverge as they extend rearwardly, and are held apart by a brace, B, secured to each beam by bolts, screws, or pins. The beams are so fastened together at their forward ends as to allow their rear ends to be moved toward and from each other. To allow these various adjustments to be made, and to secure them in various positions, I provide the bar B with a number of apertures, $b$, through which the bolts $b'$ pass. The beams are the largest in cross-section from $x$ to $x'$, Fig. 2, between which points they are of substantially uniform size; but they are somewhat tapering in both directions from this part. This form of beam I have found especially adapted to my cultivator, as it provides great strength at that point where it is most required. In order to allow the beams to move easily at their front ends where they are in contact—when the beams are being adjusted—I provide offsets $a$ upon the inner faces of the beams, their engaging-faces being preferably rounded. Upon the outer faces of the beams are rabbets $a'$, to facilitate securing the clevis.

D D represent the handles, attached to the beams in any preferred manner.

E E are scrapers attached to the beams and adapted to act upon each side of the row of cotton or other plants being worked. Each scraper is of the peculiar shape shown in Fig. 4—that is, of substantially triangular form—the bounding-lines of which are irregular curves. The upper edge or line, $e$, of the scraper lies throughout in a substantially horizontal plane, but bends or bows outwardly from front to rear. The curve which this edge follows is the least throughout its forward part, or to about the first of the apertures $h$, and rearwardly from that point it is shorter. The lower and forward bounding-edge, $e'$, curves downward, backward, and outward. The downward curve is greatest near its forward end, where the edge approaches nearly a vertical position. The outward curve nearly corresponds with the outward curve of the upper edge, $e$, to about the point $r$, from which point the curve is shorter, which results in throwing the lower edge at the point where it joins with the rear edge considerably farther out than any other part of the scraper. The rear edge, $e^2$, connecting the other edges, $e$ $e'$, extends first downwardly and slightly inwardly, and then downwardly, outwardly, and forwardly to the point where it joins the lower edge, $e'$.

A scraper of the construction above described acts in a very advantageous manner, and forms a ridge along the line of plants of very desirable shape, wherein the lower part of the ridge is much wider than it is near the top. A ridge of this shape retains the moisture around the roots of the plants, and causes them to well withstand dry weather. As the implement is moved along the row of plants, the forward nearly-vertical part of edge $e'$ cuts or slices off the earth near the top of the ridge and a short distance from the plants. Further movement of the scraper causes that portion of earth cut by the forward part of the edge $e'$ to be thrown outward and away from the ridge by the scraper, while the rear portion of the edge $e'$ continues to cut deeper into the earth, but farther away from the central line of the drill or ridge.

Each of the scrapers is attached to its beam in the following manner: F is a bar or strap of metal clipped or otherwise attached to the inner face of the beam at its upper end, and fastened at its lower end to the scraper E; and F' is a similar bar or strap of metal connecting the rear part of the scraper with the outer face of the beam.

H is a U-shaped brace bolted to the inner faces of the scrapers and adapted to rigidly hold them apart. It bows upwardly, so as not to interfere with the plants being cultivated. In order to allow the scrapers to be adjusted and yet permit the brace H to be used, whatever be their distance apart, I provide the scrapers with two or more apertures, h, by which the brace may be attached to the scrapers. When the beams are brought closer together, the brace is correspondingly shifted to the rear holes, and when moved apart the bolts connecting the scrapers and brace are inserted through the holes in front.

I I are plows or shovels of any preferred character, situated just outside of the scrapers. They are attached to the beams by any preferred means, and operate to turn over or pulverize the earth removed by the scrapers.

L is a brace or cross bar situated between the handles D. It is provided with a series of apertures, through which pass pins M.

When it is not desired to use the scrapers, they may be removed, and another plow or shovel attached in front of the one I, there being apertures n in the beams, through which the standard or brace of the plow may pass.

It will thus be seen that my implement may be readily changed from a cotton-scraper to a gang-plow or cultivator.

What I claim is—

1. In a cultivating implement, the combination of the beams adjustable toward and from each other, the scrapers carried by the beams, and a brace attached to the scrapers and holding them apart and adapted to be secured to the scrapers at different points, whereby they may be moved toward and from each other and securely held in any desired position, substantially as set forth.

2. In a cultivating implement, the combination of the beams A A, adjustable toward and from each other, the brace B between the beams, the scrapers carried by the beams and provided with a series of apertures, h, the U-shaped brace H, situated between the scrapers and holding them apart, and screws or bolts passing through the apertures h and the brace H, substantially as set forth.

In testimony whereof I affix my signature in presence of two witnesses.

JAMES M. GRIFFITH.

Witnesses:
JOHN T. HARRIS,
GEORGE W. THOMPSON.